3,141,235
POWDERED TANTALUM ARTICLES
William H. Lenz, Los Alamos, N. Mex., assignor to the United States of America as represented by the United States Atomic Energy Commission
No Drawing. Filed Apr. 11, 1963, Ser. No. 272,494
6 Claims. (Cl. 29—182)

This invention relates to an improved powdered tantalum composition and more particularly to a powdered tantalum metal body containing a small amount of yttrium.

With tantalum metal playing an increasing role as a container for nuclear reactors and especially in those reactors in which plutonium is used as fuel, it becomes increasingly important to improve the technology of tantalum metals and particularly powdered tantalum which can be easily fabricated into any desired shape.

Tantalum powder does not sinter well unless the particle size is of the order of 2 or 3 microns. Tantalum powder of this particle size always contains enough oxygen to cause hardening during the sintering process and thus decreases the ductility of the sintered tantalum body. Furthermore, articles pressed from tantalum powder to approximately the final size and shape have the disadvantage that furnaces available for sintering such bodies do not economically attain temperatures above 2000° C. at which tempearture the impurities contained in the tantalum begin to volatilize. Tantalum articles that are sintered at these higher temperatures attain a density of 80-90 percent but are harder or less ductile than normal tantalum metal and cannot be shaped or worked if further sizing is needed. This invention has found a way to surmount such difficulties by the addition of small amounts of yttrium which aid in the sintering in that it increases the final density to above 90 percent theoretical and also removes the hardening effect by combining with any oxygen present to form yttrium oxide, an oxide with an extremely high melting point and which is also insoluble in the tantalum. The resulting sintered tantalum metal containing the yttrium is soft, ductile, and workable.

It is therefore an object of this invention to prepare a ductile, soft, sintered, powdered tantalum article.

It is another object of this invention to provide a method of sintering powdered tantalum articles that posses physical properties of being soft, ductile, and workable, and can be sintered at a temperature of 1950° C.

It is a further object of this invention to provide a highly dense powdered tantalum article whose sintered density is in excess of 91 percent of theoretical density.

Still further objects of this invention will be apparent from the description and examples which follow.

*Example 1.*—A high grade commercial tantalum powder with oxygen as the main impurity and with an average particle size of 2.0 microns is mixed with 3 weight percent yttrium hydride. The yttrium hydride is prepared by heating yttrium metal in a pure hydrogen atmosphere for about 2 hours at 400° C. After cooling the yttrium hydride is pulverized using a steel mortar and pestle, so as to pass through a 400 mesh screen (U.S. Standard Sieve Series). The powdered tantalum and yttrium is then blended in any appropriate blending equipment and the resulting mixture of 97 weight percent tantalum—3 weight percent yttrium hydride is pressed into discs or any desired shape in a tungsten carbide or steel die. The pressed tantalum-yttrium powder is then sintered in a high vacuum furnace in which the pressed article is heated slowly through the temperature range of 300 to 1100° C. until all hydrogen is evolved from the yttrium hydride and then the tantalum-yttrium powder is heated to a temperature of 1950° C. in a high vacuum and held at that temperature for a period of one hour.

*Example 2.*—Tantalum powder of an average particle size of 3.5 microns and containing approximately 0.2 percent oxygen as the major impurity is mixed with one weight percent powdered yttrium metal. The same steps as described in Example 1 are followed and the resulting sintered tantalum article is ductile, workable, and has a density 91.2 percent of theoretical.

*Example 3.*—A powdered tantalum rich alloy containing 70 weight percent tantalum, 30 weight percent tungsten, is mixed with 1 weight percent powdered yttrium metal and following the steps outlined in Example 1 a sintered tantalum-tungsten alloy is obtained which has physical characteristics of high density and of being more ductile than without the yttrium.

A convenient way of adding the yttrium to the tantalum powder or powdered tantalum rich alloy is in the form of yttrium hydride chips. The yttrium hydride chips are brittle and may be easily crushed to a fine powder which is then mixed with the tantalum powder just before the pressing and sintering steps. The following table shows the effect of adding yttrium to a tantalum powder containing 0.3 to 0.4 weight percent oxygen, sintering in a vacuum for 1 hour at 1950° C.

| Percent $YH_3$,[1] w/o | Percent Theor. Dens. | | Brinell Test | | |
|---|---|---|---|---|---|
| | Green | Sint. | Load, kg. | d(mm.) | Relative Hardness |
| 0 | 82.5 | 89.8 | 3,000 | 3.9 | 197 |
| 1.0 | 82.9 | 94.0 | 3,000 | 5.5 | 99 |
| 3.0 | 86.4 | 91.2 | 2,000 | 5.4 | 69 |

[1] The hydrogen content of the $YH_3$ is only 2%.
d=diameter in mm. of Brinell impression.

From the above, it is seen that although the sintered density is increased slightly, the hardness of the tantalum is decreased to approximately ½ to ⅓ of the original value by the addition of 1 to 3% of yttrium. Furthermore, the Brinell test on these specimens showed that the yttrium-treated specimens withstood a high degree of deformation (ductility) before cracking.

While the foregoing examples have disclosed the preferred preparation of the powdered tantalum and tantalum-rich metal, it is understood that other proportions may be successfully employed. For example, if the oxygen content is greater than 0.7 weight percent more than 3 weight percent yttrium will be needed to combine with all the oxygen to form the insoluble yttrium oxide compound. Consequently, there is no maximum amount of yttrium or yttrium containing compounds that is critical to this process; the amount of yttrium is determined by the amount of oxygen present in the tantalum powder. The following calculations give the amounts of yttrium needed to combine with various amounts of oxygen which is present in the tantalum.

$$0.1\% \ O_2 — 0.37\% \ Y$$
$$0.3\% \ O_2 — 1.11\% \ Y$$
$$0.5\% \ O_2 — 1.85\% \ Y$$
$$0.7\% \ O_2 — 2.50\% \ Y$$

Although in the examples the inventor has cited only tantalum and tantalum alloys which would be benefited by the addition of yttrium to the powdered metal, similar metals such as hafnium, columbium, titanium, and vanadium would be expected to have improved sinterability, increased density, and workability with the addition of yttrium.

It is thus seen that this invention discloses new and improved alloys that may readily be obtained by methods and equipment which are available in any well equipped metallurgical laboratory and that have desirable properties not found in present known alloys prepared directly by powder metallurgy.

It is to be understood that this application is not to be limited except as indicated in the appended claims.

What is claimed is:

1. A ductile, workable, sintered metal selected from the class consisting of tantalum, columbium, hafnium, titanium and vanadium containing at least one weight percent yttrium, the balance being essentially at least one of the said metals.

2. A ductile, workable, sintered tantalum metal article containing one to 3 weight percent yttrium, the balance being essentially tantalum.

3. A method of making an improved ductile sintered tantalum metal article containing about 1 to 3 percent by weight yttrium, the balance being essentially tantalum, consisting of mixing tantalum powder having an average particle size of 3 microns with a yttrium hydride powder of the aforementioned percentage, pressing the resulting powdered mixture into the desired shape and sintering in a high vacuum furnace at a temperature of about 1950° C. for at least one hour.

4. The method of claim 3 in which the tantalum powder contains a minor amount of tungsten metal powder.

5. The method of claim 4 in which the said tantalum powder contains 30 weight percent tungsten powder.

6. A ductile, workable sintered tantalum-rich-tungsten metal alloy article made by the method of claim 5 which contains 1 weight percent yttrium.

References Cited in the file of this patent

UNITED STATES PATENTS

| | | |
|---|---|---|
| 1,732,326 | Cooper | Oct. 22, 1929 |
| 2,904,430 | Taylor | Sept. 15, 1959 |
| 3,091,525 | Hunt | May 28, 1963 |

OTHER REFERENCES

AEC Document AEC-tr-3996, "Yttrium and Its Alloys," Nuclear Science Abstracts, vol. 13, Abstract No. 21233, U.S. Atomic Energy Commission, Technical Information Service, 1959.